United States Patent
Weihrauch

(10) Patent No.: US 6,353,958 B2
(45) Date of Patent: *Mar. 12, 2002

(54) TOOTHBRUSH

(75) Inventor: Georg Weihrauch, Wald-Michelbach (DE)

(73) Assignee: Coronet-Werke GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,113

(22) PCT Filed: Sep. 1, 1995

(86) PCT No.: PCT/EP95/03442

§ 371 Date: Apr. 29, 1997

§ 102(e) Date: Apr. 29, 1997

(87) PCT Pub. No.: WO96/10934

PCT Pub. Date: Apr. 18, 1996

(30) Foreign Application Priority Data

Oct. 7, 1994 (DE) .......................... 44 35 888

(51) Int. Cl.⁷ ................................ A46B 9/04
(52) U.S. Cl. ................. 15/167.1; 15/143.1; D4/104
(58) Field of Search ................ 15/172, 167.1, 15/167.2, 143.1, 144.1, 201; D4/104

(56) References Cited

U.S. PATENT DOCUMENTS

| 759,490 | A | * | 5/1904 | Yates | |
| 882,021 | A | * | 3/1908 | Schigelinsky | |
| 2,650,383 | A | * | 9/1953 | Bressler | 15/167.1 |
| 2,664,582 | A | * | 1/1954 | Kammann | |
| 5,054,154 | A | * | 10/1991 | Schiffer et al. | 15/167.1 |
| 5,339,482 | A | * | 8/1994 | Desimone et al. | 15/167.1 |

FOREIGN PATENT DOCUMENTS

| DE | 3612108 | * | 10/1987 | 15/167.1 |
| DE | 3840136 | * | 5/1990 | |
| DE | 3923495 | * | 1/1991 | |
| DE | 9310112.0 | * | 7/1994 | |
| EP | 0281017 | | 2/1988 | |
| FR | 1247433 | | 10/1960 | |
| GB | 2050156 | * | 1/1981 | 15/167.1 |
| WO | 9315627 | | 8/1993 | |

* cited by examiner

Primary Examiner—Gary K. Graham
(74) Attorney, Agent, or Firm—Antonelli, Terry, Stout & Kraus, LLP

(57) ABSTRACT

In a plastic toothbrush in which the substantially rigid brush head is connected by means of a spring part to the substantially rigid handle and the spring part is embedded in the plastic, a construction advantageous from the manufacturing, use and environmental standpoints is obtained in that the spring part is made at least preponderantly from plastic with a higher modulus of elasticity than the plastic surrounding it.

26 Claims, 2 Drawing Sheets

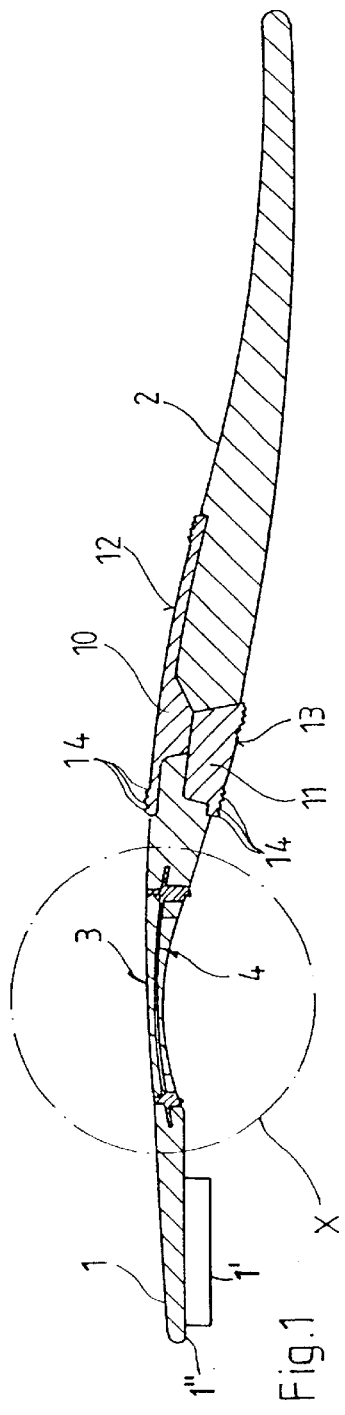
Fig.1
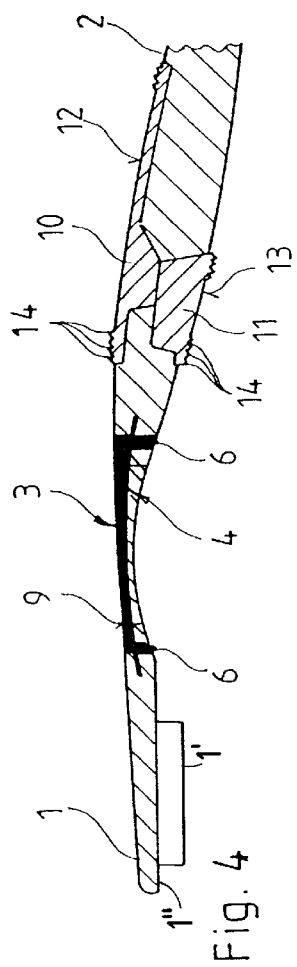
Fig.4
Fig.3
Fig.2

TOOTHBRUSH

BACKGROUND OF THE INVENTION

1. Field of the Invention

The invention relates to a toothbrush having a one-piece, plastic injection moulded brush body comprising a substantially rigid head receiving the bristles, a substantially rigid handle and a tapering neck connecting said two parts, which has a spring part made from a material with a higher modulus of elasticity than the plastic of the brush body.

2. Description of the Prior Art

Toothbrushes are mainly used for cleaning the teeth and the interdental gaps, but frequently also are used to exercise a massaging action on the gums or the marginal areas thereof. The latter action has more particularly led to special constructional measures on toothbrushes. These include the construction of a resilient connection between the brush head and the handle, because, for stability reasons, they are made from a comparatively rigid plastic, generally by injection molding.

Various constructions are known for obtaining a resilient connection between the brush head and the handle. According to FR 1 247 433 the head is "split" longitudinally down to the handle area and the ledge-like parts covered with bristles are overengaged by a locking ring, by means of which the free length of the ledges and consequently the flexibility of this more elastic area than the handle can be adjusted. This construction is complicated from the design and use standpoints. Due to the gaps which exist it is subject to hygienic objections. Much the same applies for another construction (U.S. Pat. No. 4,520,526), in which the toothbrush is weakened in the transition area between the head and the handle by recesses in the plastic, so as to give said area a greater resilience. Here again dirt, toothpaste residues, bacteria, etc. can be deposited. Much the same applies for constructions in which the transition area is provided with pronounced profilings (EP 0 281 017, WO 93/15 627).

Therefore from the hygienic standpoint preference is given to those constructions in which the transition between the brush head and the handle is of a substantially smooth-walled nature, although a spring action is obtained. Thus, it is known (DE 38 40 136) to insert a metal leaf spring in the transition area between the handle and the brush head and to embed said spring completely in the plastic. With the leaf spring, which has a higher modulus of elasticity than the plastic surrounding it, it is possible to ensure a moving back of the toothbrush in the case of excessive pressure, as well as a constant, adequate pressure application when the toothbrush is correctly guided.

Even though this construction with a metallic leaf spring is largely satisfactory from the use standpoint, it still suffers from a number of disadvantages. It leads to the manufacturing problem that the leaf spring must be injection moulded into the plastic, which requires corresponding constructional precautions on the injection mould. In addition, due to their extremely thin wall thickness leaf springs during the manufacturing sequence are difficult to handle both manually and with manipulators and can only be positioned with difficulty in the injection moulding machine. They also form no connection with the surrounding plastic. Thus, on springing out in the vicinity of the edges of the leaf spring necessarily compressive and shear stresses act on the surrounding plastic, which can lead to breaking of the cross-section in the transition area between the brush head and the handle must be overdimensioned. However, particularly at this point an especially slender shape is desired, so that it is possible to guide the necessary movements of the toothbrush even with the mouth closed. Finally, all metallic materials are undesired in the oral hygiene sector, even if as in the present case they are not exposed. They also represent a substantial problem during the recycling of toothbrushes, which has considerable importance due to the mass consumption thereof. A complete separation of the materials would require a complete crushing of the toothbrush. In view of the small weight proportion of the metal the costs involved would hardly be acceptable.

Finally, it has already been proposed (WO 93/15 627, DE 38 40 136) to make the brush body extremely slender in the vicinity of the neck and in this way obtain a spring action. A rubber-elastic elastomer is then injected around the very thin cross-section. The plastics normally used for the brush body do not have an adequate modulus of elasticity, in order to obtain an adequate and in particular permanent spring action. In addition, the transitions from the handle or head must be extremely steep, so that at the transitions breakages can easily occur. If an adequately high modulus of elasticity is provided, then very high-grade plastics must be used for the brush body. This is unacceptable from the costs standpoint with mass produced articles, like toothbrushes.

SUMMARY OF THE INVENTION

The invention is a toothbrush, which is simple to manufacture, favourable to use and also environmentally friendly. It must also be possible to easily adjust the spring action.

According to the invention this problem is solved by the spring part, with the higher modulus of elasticity than the plastic of the brush body, being at least preponderantly made from plastic and is at least partly embedded in the plastic of the brush body, accompanied by the formation of the neck. Instead of this, the spring part can also at least partly envelop the brush body in the neck area.

The invention firstly leads to the advantage that the toothbrush is entirely made from plastic and consequently no disposal problems occur. In addition, any metal fraction, which is undesired in the oral hygiene sector, is avoided. Finally, such a toothbrush can be inexpensively manufactured, e.g. in two-component injection moulding processes, embedding processes, etc. As the plastic spring part is embedded in plastic, there is no alien material pairing and as a function of the plastics there can even be an integral joint. Only the spring part need be made from high-grade plastic, whereas the brush body can be made from conventional, inexpensive plastics.

The spring part can be made exclusively of pure or a filled plastic, the fillers being present in a proportion of 1 to 30 vol. %.

Preferably the spring part is made from a fiber-reinforced plastic, use being preferably made of glass fibers. Such a spring part can be separately injection molded and then inserted or injection mould in integrated manner in the injection mould for the toothbrush. However, the spring part can also be produced by injection moulding round the neck area of the brush body.

The spring part can have a flat, polygonal, round or oval cross-section, but also a U, T or I-cross-section, so as in this way to influence the nature of the springing out of the brush head. This springing out can not only be provided counter to the pressure on the tooth surface, but also at least to a limited extent transversely thereto or in any random direction.

Advantageously the spring part has a higher moment in inertia than the remaining neck cross-section and extends substantially over the entire brush body neck length.

The construction according to the invention gives the possibility of adjusting the spring tension of the spring part through the choice of the plastic and/or the fillers and/or its cross-section. This spring tension adjustment can take place within wide ranges. Thus, for toothbrushes for children a smaller resilience is used than for toothbrushes for adults. Compared with all known constructions there is a material and consequently cost saving. The neck can also be made extremely slender with gentle transitions between the handle and the head.

In a further preferred construction the spring part has projections transversely to its extension. These projections can initially serve as simple positioning aids in the injection mould and also for maintaining position during moulding. In addition, the spring part is "centered" and anchored in the surrounding plastic mass.

The invention more particularly offers the possibility for the projections to extend up to the surface of the plastic enveloping the spring part. This also leads to the manufacturing advantage that the spring part can be positioned directly at the mould wall and no position aids have to extend into the cavity. These projections are not prejudicial on the surface, because they are also made from plastic.

In the area on which they appear on the visible side, said projections can in fact fulfil a further function, namely as information carriers, e.g. for manufacturers' marks, publicity slogans, use information, etc. and can be shaped as such.

In a further advantageous construction the spring part with its elongated surfaces is located on the surface of the enveloping plastic.

This simultaneously provides a large-surface support of the spring part in the injection mold for the handle and head of the toothbrush. In particular the spring part with said elongated surface on the one hand and the projections located on the opposite side on the other can be fixed between the two injection mold parts and therefore accurately positioned. By a corresponding colouring of the spring part, its spring function can be optically indicated.

According to another advantageous embodiment, in the gripping area of the handle is embedded at least one gripping element made from a plastic with a higher friction coefficient than that of the surrounding plastic.

For optical and hygienic reasons the handle and head of a plastic toothbrush are generally made from a plastic with a smooth and optionally glossy surface, so that the hand is not subject to particularly good handling characteristics and is not grip-proof. This disadvantage is increased by the spring characteristic in the vicinity of the brush neck, because the head performs relative movements with respect to the handle and consequently the hold of the fingers on the handle is reduced and the fingers can easily slip off. This is counteracted by the gripping elements with increased friction coefficients. They ensure that the fingers have a firm hold on the handle, so that the toothbrush does not slip when used.

Preferably the gripping element is made from an elastomer, which inherently has a higher friction coefficient than the thermoplastics normally used for the head and handle.

The good grip can be further increased in that in each case one gripping element is provided on the top and bottom of the handle, so that the thumb gripping the underside also has a firm hold.

A further improvement to the good handle action results from the fact that the gripping elements are provided on their exposed surface with a friction increasing profile, which e.g. follows the shape of the finger tips.

The two gripping elements on the top and bottom are preferably in contact in the interior of the handle, which facilitates their insertion in the injection mould. However, they can also pass into one another in one piece. In conjunction with the construction of the gripping elements from an elastomer, a very elastic gripping surface is obtained.

Finally, the spring part and the gripping elements are preshaped and injected round by the plastic forming the handle and head.

In place of a separate production of the parts and subsequent embedding or injecting round, it is also possible to produce the brush body, spring part and gripping elements in a multicomponent injection moulding process.

BRIEF DESCRIPTION OF THE DRAWINGS

The invention is described in greater detail hereinafter relative to non-limitative embodiments and the attached drawings, wherein show:

FIG. 1 A longitudinal section through a toothbrush without bristles.

FIG. 2 A larger-scale section in area X of FIG. 1.

FIG. 3 A plan view of the sectional representation of FIG. 2 from below.

FIG. 4 A section through another embodiment corresponding to FIG. 1, but in broken away form.

DESCRIPTION OF THE PREFERRED EMBODIMENTS

Figure 5:
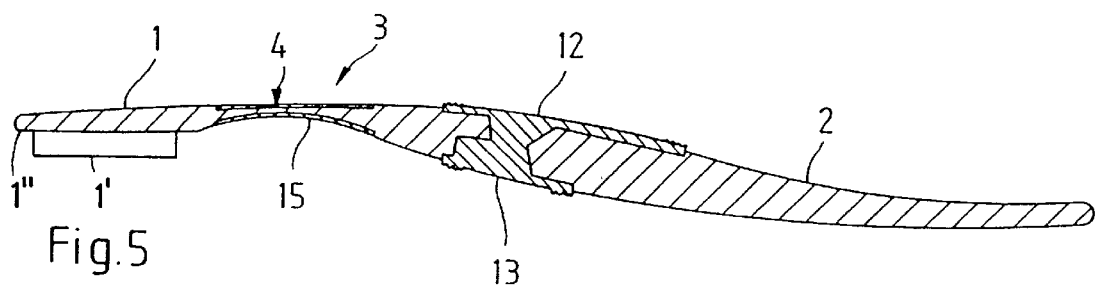
FIG. 5 A longitudinal section through another embodiment.
Figure 7:
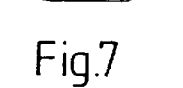
FIG. 7 A section VII—VII according to FIG. 6.
Figure 6:
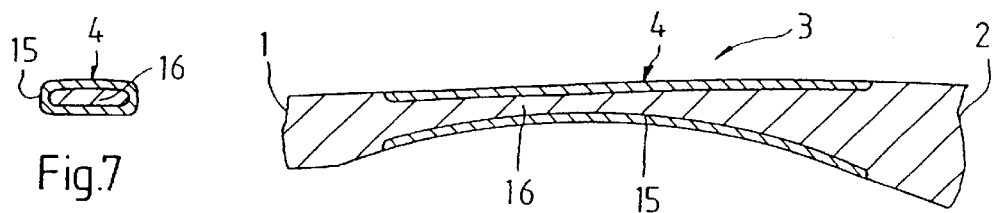
FIG. 6 A larger-scale detail of FIG. 5.

The toothbrush according to FIG. 1 comprises a head 1 with bristles 1' and an elongated handle 2, which are interconnected by means of a slender transition area 3 forming the neck. The bristles 1' project from surface 1" which extends longitudinally along the head 1 and a longitudinal dimension of the toothbrush body.

In the constricted transition area 3 from the brush head 1 to the handle 2 is embedded a spring part. For example the entire toothbrush is produced by injection molding and injection takes place round the spring part 4. As can in particular be gathered from FIG. 2, the spring part 4 is consequently surrounded on all sides by plastic, so that the toothbrush offers a unitary exterior.

The spring part 4 has a higher modulus of elasticity than the surrounding plastic of the brush body, but is preponderantly made from plastic, preferably glass fibre-reinforced plastic, and can be constructed similar to a leaf spring or wire rod, but can also have an oval or polygonal cross-section. Thus, the toothbrush neck 3 is given a resilience approximately perpendicular to the longitudinal extension of the brush body, but by a corresponding cross-sectional shape a more or less marked resilience can also be obtained in other directions.

In the embodiment shown in FIG. 1 the spring part has a flat, sheet-like main part 5, which is provided in the vicinity of its ends with projections 6 and 7 running transversely to its extension. These projections can be used for positioning purposes within the injection mold and preferably project up to the surface of the neck 3 and in this way, as shown in FIG. 3, can additionally serve as carriers for information 8. This information can be produced by corresponding impressions in the mould at the time of producing the spring part 4.

The embodiment of FIG. 4 differs from that of FIG. 1 in that the spring part 4 is located with the surface 9 extending in the longitudinal direction in the top surface of the neck 3 between the head 1 and the handle 2. In correspondingly flat manner the preshaped spring part 4 can be supported in the injection mold for injecting around with the plastic forming the head 1 and the handle 2. Through suitable color differences the function of the spring part can be optically indicated to the user. Thus, the toothbrush constructed according to the invention can be differentiated from some other toothbrush. The bristles 1' project from surface 1" which extends longitudinally along the head 1 and a longitudinal dimension of the brush body.

The handle 2 has in its thickened gripping area gripping elements 10, 11 embedded in the plastic, the upper gripping element 10 having a relatively large gripping surface and the lower gripping element 11 a somewhat smaller gripping surface. The gripping elements are made from an elastomer and can additionally be provided on their free surface with a friction-increasing profile, e.g. in the form of grooves 14, which preferably run in closed, concentric tric ovals and are consequently adapted to the shape of the finger tips. The gripping elements 10 and 11 are in engagement with one another in the interior of the handle 2, so that they can be perfectly supported in the injection mould for injecting round with the plastic of head 1 and handle 2.

In the embodiment according to FIG. 5 the spring part 4 is constructed as a type of sleeve 15, which in the transition area 16 envelops the plastic of the brush body. Manufacture preferably takes place in the two-component injection moulding process, in that the brush body formed from the head 1, handle 2 and transition area 16 is firstly injection moulded in a mould. Subsequently, the transition area 16 is injected around in the same mold with the plastic forming the spring part 4 and in this way the neck 3 is formed. The spring part 4 has a higher modulus of elasticity than the plastic in the transition area 16 of the brush body enveloped by it. The gripping elements 10, 11 are subsequently molded in the two-component injection moulding process, so that the are constructed in one piece. The bristles 1' project from surface 1" which extends longitudinally along the head 1 and a longitudinal dimension of the brush body.

In all the embodiments the spring part 4 extends over the entire transition area 3, 16 into the head 1 or the handle 2, so that there is also an adequate stability at the transitions.

What is claimed is:

1. A toothbrush consisting of:
   a one-piece, plastic injection molded toothbrush body defining a longitudinal dimension, a substantially rigid toothbrush head having a surface extending along the longitudinal dimension from which toothbrush bristles project, a substantially rigid toothbrush handle, a tapered toothbrush neck connecting the head and the handle, and a non-metallic toothbrush spring part with a higher modulus of elasticity than the plastic of the toothbrush body wherein the spring part is at least partially embedded in the neck.

2. A toothbrush according to claim 1 wherein:
   the spring part is at least preponderantly made from plastic and the spring part is at least partially embedded in the plastic of the brush body.

3. A toothbrush according to claim 2 wherein:
   the spring part is exclusively made from plastic.

4. A toothbrush according to claim 2 wherein:
   the spring part is made from a filled plastic.

5. A toothbrush according to claim 4 wherein:
   fillers of the filled plastic are provided in a proportion of 1 to 30 vol. %.

6. A toothbrush according to claim 4 wherein:
   the spring part and the brush body are made from the same plastic.

7. A toothbrush according to claim 4 wherein:
   the spring part is made from a fiber-reinforced plastic.

8. A toothbrush according to claim 2 wherein:
   the spring part has a flat, polygonal, round or an oval cross-section along a length thereof.

9. A toothbrush according to claim 2 wherein:
   the spring part has a T, I or a U-cross section along a length thereof.

10. A toothbrush according to claim 2 wherein:
    the spring part essentially extends over an entire length of the tapered neck.

11. A toothbrush according to claim 2 wherein:
    a spring tension of the spring part is variable by a choice of at least one of the plastic, fillers of the plastic or cross section.

12. A toothbrush according to claim 2 wherein:
    the spring part has projections transverse to a longitudinal dimension thereof.

13. A toothbrush according to claim 12 wherein:
    the projections extend up to a surface of plastic enveloping the spring part.

14. A toothbrush according to claim 13 wherein:
    the projections are information carriers.

15. A toothbrush according to claim 14 wherein:
    the projections are shaped as information carriers at least in the area thereof on a surface of the plastic enveloping the carriers.

16. A toothbrush according to claim 12 wherein:
    the projections serve as an anchoring mechanism for the spring part.

17. A toothbrush according to claim 2 wherein:
    the spring part has elongated surfaces located on plastic enveloping the spring part.

18. A toothbrush according to claim 2 wherein:
    a gripping area of the handle has embedded therein at least one gripping element made from a plastic with at least one of a higher friction coefficient or a higher elasticity than plastic surrounding the gripping area.

19. A toothbrush according to claim 18 wherein:
    the gripping element is made from an elastomer.

20. A toothbrush according to claim 19 wherein:
    one gripping element is provided on a top and a bottom of the handle.

21. A toothbrush according to claim 19 wherein:
    the gripping element is provided with a friction-increasing profile on a exposed surface thereof.

22. A toothbrush according to claim 19 wherein:
    two gripping elements are in contact with one another.

23. A toothbrush according to claim 19 wherein:
    two gripping elements pass in one piece through an interior of the handle.

24. A toothbrush according to claim 18 wherein:
    the gripping area is preshaped as a shaped body and is injected around the plastic forming the brush body.

25. A toothbrush according to claim 2 wherein:
    the spring part is preshaped as a shaped body and is injected around the plastic of the toothbrush body.

26. A toothbrush according to claim 2 wherein:
    the tapered neck has a smooth continuous surface extending between the handle and the head.

\* \* \* \* \*